United States Patent [19]

Kunz

[11] Patent Number: 4,591,538

[45] Date of Patent: May 27, 1986

[54] BINARY ELECTROLYTE FOR MOLTEN CARBONATE FUEL CELLS

[75] Inventor: Harold R. Kunz, Vernon, Conn.

[73] Assignee: United Technologies Corporation, Hartford, Conn.

[21] Appl. No.: 677,625

[22] Filed: Dec. 3, 1984

[51] Int. Cl.[4] .............................................. H01M 8/14
[52] U.S. Cl. ......................................... 429/16; 429/33; 429/46; 429/103; 252/62.2
[58] Field of Search .................. 429/16, 33, 103, 46, 429/193, 191; 252/62.2

[56] References Cited

U.S. PATENT DOCUMENTS

| | | | |
|---|---|---|---|
| 3,855,002 | 12/1974 | Schroll | 136/86 R |
| 3,878,296 | 4/1975 | Vine et al. | 423/600 |
| 4,079,171 | 3/1978 | Marianowski et al. | 429/46 |
| 4,242,426 | 12/1980 | Arendt | 429/193 |
| 4,247,604 | 1/1981 | Marianowski et al. | 429/40 |
| 4,317,865 | 3/1982 | Trocciola et al. | 429/41 |
| 4,317,866 | 3/1982 | Trocciola et al. | 429/41 |
| 4,322,482 | 3/1982 | Bushnell et al. | 429/41 |

OTHER PUBLICATIONS

Advanced Fuel Cell Development by P. A. Finn et al., (Jun. 1979).
Electromigrational Composition Gradients in Molten Carbonates: A review by J. Braunstein et al., (Oct. 1982).

Primary Examiner—Charles F. Lefevour
Attorney, Agent, or Firm—Gene D. Fleischhauer

[57] ABSTRACT

A binary electrolyte for a molten carbonate fuel cell is disclosed. The electrolyte is approximately 72 m % $Li_2CO_3$ and 28 m % $K_2CO_3$ and displays a uniform lithium to potassium in molar ratio during operation along the length of the fuel cell stack.

8 Claims, 7 Drawing Figures

FIG.3 COMPARISON OF ELECTROLYTE COMPOSITION VARIATION OF Li/K MOLAR RATIO WITH POSITION ALONG A 20-CELL FUEL STACK

FIG. 4 VARIATION OF Li/K MOLAR RATIO WITH POSITION ALONG FUEL CELL SIMULATED STACK
(62 m% $Li_2CO_3$ - 38 m% $K_2CO_3$)

BINARY ELECTROLYTE FOR MOLTEN CARBONATE FUEL CELLS

TECHNICAL FIELD

This invention relates to molten carbonate fuel cells and more particularly to an electrolyte for use within such fuel cells.

BACKGROUND ART

Molten carbonate fuel cells employ an electrolyte which is solid at room temperature and liquid or molten at operating temperatures which generally range between 500° and 700° C. These electrolytes include binary alkali metal carbonate compositions such as binary lithium-potassium carbonate compositions ($Li_2CO_3$-$K_2CO_3$). An example of one composition is the commonly used eutectic composition consisting essentially of 62 mole % (m %) $Li_2CO_3$—38 mole % (m %) $K_2CO_3$.

In most applications a plurality of fuel cells are stacked together to form a fuel cell stack. The fuel cells are joined in series to increase the power output of the stack and to maximize the output voltage of the stack. As a result of forming the stack, a voltage gradient exists along the stack from one end of the stack to the other. This voltage gradient may result in a migration of lithium and potassuim ions toward the negative end of the stack and carbonate ions toward the positive end of the stack along any path which permits movement of the ions. Because of differences in mobility between the lithium and potassium ions in the eutectic composition, the lithium and potassium ions tend to move at different rates along the length of the stack such that the molar ratio between lithium and potassium ions varies along the length of the stack. If the variation in molar ratio is great, the electrolyte in certain cells may have properties that differ markedly from the properties of the electrolyte in other cells in the stack.

The electrolyte in one cell may have reactant solubilities, ionic conductivities, melting point and other properties that are harmful to the performance of the cell during steady operation. In addition, changes in melting point can result in harmful effects during operation of the stack at a reduced temperature and during non-steady operation, such as during stack shutdown.

Accordingly, it is important to develop an electrolyte in which the mobilities of the lithium and potassium ions are nearly equal to avoid large local variations in the molar ratio of lithium to potassium ions and to keep the molar ratio uniform along the cell stack.

DISCLOSURE OF INVENTION

According to the present invention, an electrolyte composition for use in molten carbonate fuel cells consists essentially of approximately 72 m % $Li_2CO_3$ and 28 m % $K_2CO_3$ which displays a uniform lithium to potassium molar ratio along a voltage gradient in a fuel cell stack under operative conditions.

In accordance with one embodiment of the present invention, an electrolyte composition for use in molten carbonate fuel cells consists essentially of 70 to 73 m % $Li_2CO_3$ and 30 m % $K_2CO_3$ and displays a uniform lithium-potassium molar ratio along a voltage gradient in a fuel cell stack under operative conditions.

In accordance with the present invention, a method for establishing an electrolyte composition of a molten carbonate fuel cell includes the steps of: determining a first amount of lithium which will react to form stable compounds during operation of the fuel cell and change the molar ratio of the binary electrolyte during initial operation of the fuel cell stack; and, disposing a molten carbonate electrolyte in the fuel cell which consists essentially of a mixture of (1) an amount of $Li_2CO_3$ containing the first amount of lithium and (2) a second amount of 70 to 73 m % $Li_2CO_3$ and 27 to 30 m % $K_2CO_3$.

In accordance with the present invention, a method of operating a fuel cell stack having a plurality of cells disposed adjacent to each other, each of which is in ion communication with adjacent cells, includes the steps of (1) employing an electrolyte which consists essentially of 70 to 73 m % $Li_2CO_3$ and 27 to 30 m % $K_2CO_3$ to pass electral charges between the cathode and the anode of each fuel cell, the electrolyte of each cell being in ion communication with the electrolytes of the adjacent cells through unavoidable flow paths which exist as a result of construction of the cell, (2) imposing a voltage gradient across the cells during operation of the cells, and, (3) operating the fuel cell stack with a uniform lithium to potassium molar ratio along the length of the fuel cell stack.

A primary advantage of the present invention is the performance of a fuel cell stack having cells which are operating with an electrolyte of uniform composition along the length of the stack and operating with an electrolyte having a lithium content which is greater than the lithium content of a eutectic composition.

Still another advantage is the improved performance stability (that is, stability of the voltage-current characteristic with respect to time) of the cell stack which results from avoiding large variations in electrolyte properties that affect the performance of the cells by maintaining a molar ratio that is uniform along the length of the cell stack.

The foregoing and other features and advantages of the present invention will become more apparent in light of the following detailed description of exemplary embodiments thereof, as illustrated in the accompanying drawings.

BEST MODE FOR CARRYING OUT THE INVENTION

Figure 1:
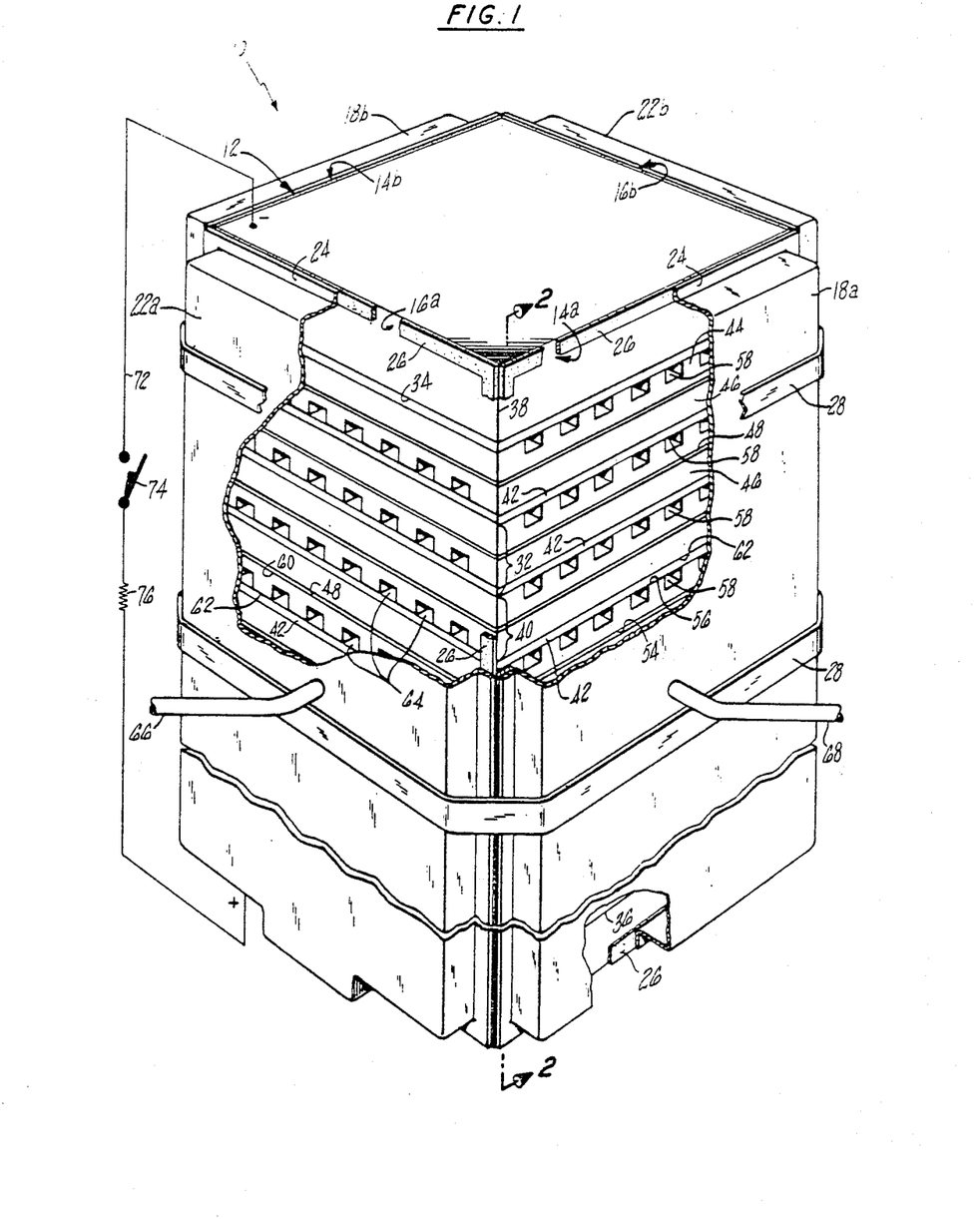
FIG. 1 is a simplified perspective view of a fuel cell stack which is partly broken away with certain dimensions exaggerated for clarity.

FIG. 1 shows a fuel cell power plant 10 which is illustrative of the present invention. The power plant includes a fuel cell stack 12. The fuel cell stack has a first pair of lengthwisely extending faces 14a and 14b and a second pair of lengthwisely extending faces 16a and 16b.

A first pair of reactant gas manifolds 18a and 18b cover the first pair of lengthwisely extending faces 14a and 14b. Manifold 18a is the fuel inlet manifold and manifold 18b is the fuel outlet manifold. A second pair of manifolds 22a and 22b cover the second pair of lengthwisely extending faces 16a and 16b. Manifold 22a is the oxidant inlet manifold and manifold 22b is the oxidant outlet manifold. In the embodiment shown, the fuel is hydrogen and the oxidant is the oxygen contained in air to which carbon dioxide has been added.

Each manifold has a flange 24 which extends around the perimeter of the manifold. A seal 26, such as a gasket formed of zirconia cloth (zirconium oxide), is disposed between the flange and the associated lengthwisely extending face of the fuel cell stack. A plurality of bands 28 extend circumferentially about the manifolds urging the manifolds tightly against the seal to block the escape of reactant gases from the interior of the manifold.

Each fuel cell stack 12 includes a plurality of repeating fuel cell units 32. The fuel cell units are disposed adjacent to each other and stacked to form a fuel cell stack. The fuel cell stack has a first end 34, a second end 36, and a lengthwise dimension L extending between the ends. A first end plate 38 disposed at the first end and a second end plate (not shown) disposed at the second end are urged toward each other by compression means (not shown) to provide a lengthwisely or axially directed load against the fuel cell units.

The stack may contain only a few fuel cell units or several hundred fuel cell units. Each cell may have an active (catalyzed) surface area of only a few square inches or an active surface area of up to 10 square feet or more, depending upon the application for which the system is designed. The present invention is particularly suited for use with stacks containing a relatively large number of cells. Nevertheless, the present invention would have application to fuel cell stacks having several fuel cells of any particular size.

Each fuel cell unit 32 includes a fuel cell 40 and a separator plate 42. The separator plate is flat and is substantially nonporous to both reactant gases and to any electrolyte which is employed in the cell. Preferably the separator plate is no greater than 50 mils thick with 10 to 20 mils thick being most preferred and may be formed of sheet metal.

Each fuel cell 40 includes a thin, sheet-like anode electrode 44 and a thin sheet-like cathode electrode 46. An electrolyte containing matrix 48 is sandwiched between the anode electrode and the cathode electrode. The electrolyte matrix may be formed of a lithium aluminate ($LiAlO_2$) matrix in which is disposed an electrolyte consisting essentially of 70 to 73 m % lithium carbonate ($Li_2CO_3$) and 27 to 30 m % potassium carbonate ($K_2CO_3$). The electrolyte matrix may be of the type described in commonly owned U.S. Pat. No. 4,322,482 issued to Bregoli et al. entitled "Electrolyte Matrix For Molten Carbonate Fuel Cells" the material in which is incorporated herein by reference. A wet capillary seal extends about the periphery of the fuel cell to block the escape of reactant gases from the fuel cell. An example of such a capillary seal is described in commonly owned U.S. Pat. No. 3,855,002 issued to Schroll entitled "Liquid Electrolyte Fuel Cell with Gas Seal" the material in which is incorporated herein by reference.

The anode electrode 44 is relatively thick in comparison to the electrolyte matrix 48 and is a porous, structure formed of a material which is compatible with the electrolyte. An example of such a material is porous nickel. The anode has a thickness of about 80 mils which includes a catalyst layer of about 25 mils having a first flat face 54 which faces lectrolyte containing matrix 48. Each anode electrode has a second flat face 56 which adapts the anode electrode to engage the adjacent separator plate 42. A plurality of parallel passages 58 in the second flat face extend perpendicular to the lengthwisely extending fuel inlet face 14a. The passages 58 are bounded by the separator plate 42 and provide a path for the fuel which extends between the interior of the fuel inlet manifold 18a and the interior of the fuel outlet manifold 18b.

Each cathode electrode has a first flat face 60 which engages the electrolyte tile 48. The cathode has a second flat face 62 which adapts the electrode to engage the adjacent separator plate 42. A plurality of parallel passages 64 in the second flat face 62 are bounded by the separator plate. These passages extend perpendicular to the oxidant inlet face 16a to provide a flow path for the oxidant gas. Alternatively, a porous medium disposed adjacent to the cathode might replace the plurality of passages to add structural integrity to the cathode. The flow path would then extend through the porous medium. In either construction, the flow path extends from the interior of the oxidant inlet manifold to the interior of the oxidant outlet manifold. A first conduit 66 is in flow communication with the interior of the oxygen inlet manifold for supplying air containing carbon dioxide and oxygen to the oxygen inlet manifold. A second conduit 68 is in flow communication with the interior of the fuel inlet manifold for providing fuel to the fuel inlet manifold. Two exhaust conduits (not shown), each in flow communication with the interior of an outlet manifold, duct the exhausted gases away. An electrical connector 72 extends from one end of the stack to the other and is in series with a switch 74 and a load 76.

Figure 2:
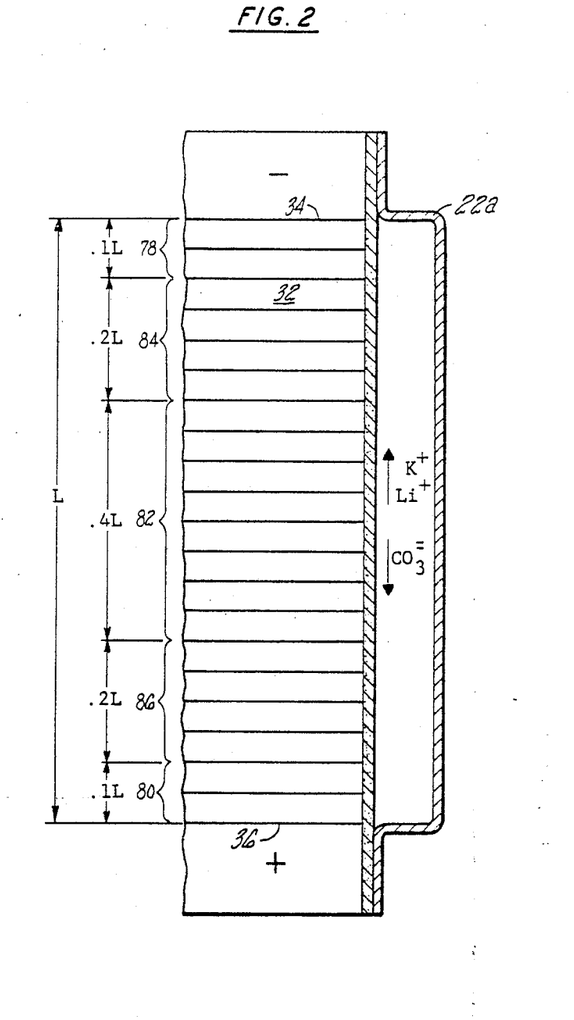
FIG. 2 is a schematic representation of the fuel cell stack in FIG. 1 taken along the lines 2—2 of FIG. 1.

FIG. 2 is a schematic representation of the fuel cell stack shown in FIG. 1 taken along the lines 2—2 to show the relationship between the zirconia gasket 26, the manifold 22a and the edges of the fuel cell units 32. Each electrolyte tile 48 is in ion communication with the zirconia gasket.

The fuel cell stack has fuel cell units located in two end regions 78, 80; fuel cell units located in a central region 82; and, fuel cell units located in two intermediate regions 84, 86 extending between the central region and the end regions. Each end region comprises ten percent of the length L of the fuel cell stack (0.1 L), each intermediate region comprises twenty precent of the length L (0.2 L), and the central region comprises forty percent of the length L (0.4 L).

During start-up of the fuel cell power plant 10, hot gases are flowed through conduit 66 to supply heat to the fuel cell stack. The gases are compatible with the materials in the fuel cell and heat the stack to its operating temperature which lies in the range of 500° to 700° C.

As the fuel cell stack is heated and the electrolyte reaches its operating temperature, most of the lithium carbonate-potassium carbonate electrolyte disassociates. This disassociated portion of the electrolyte forms positively charged lithium and potassium ions and negatively charged carbonate ions. After the electrolyte reaches its operating temperature, hydrogen fuel is flowed through conduit 68 to the anode electrode 44 of each fuel cell via the passages 58. Oxygen and carbon dioxide are flowed through conduit 66 to the cathode electrode of each fuel cell via the passages 64. At the anode, negatively charged carbonate ions combine with the hydrogen gas to form water vapor, carbon dioxide and to release two electrons as set forth in the following equation $$H_2 + CO_3^{2-} \rightarrow H_2O + CO_2 + 2e^-.$$

At the cathode, oxygen from the air combines with carbon dioxide and two electrons to form a carbonate ion as set forth in the following equation $$\tfrac{1}{2}O_2 + 2e^- + CO_2 \rightarrow CO_3^{2-}.$$

As a result of these reactions, an excess of positive ions within each fuel cell are in the vicinity of the anode and an excess of negative ions are in the vicinity of the cathode. These ions cause the migration of carbonate ions from the cathode to the anode. Closing the switch 74 permits the flow of electrical current in the external circuit to provide the necessary electrons to the cathode and to remove the released electrons at the anode. Because of the orientation of the anodes and cathodes of the cells, the end 34 of the stack is negative and the end 36 of the stack is positive. This is reflected in a voltage gradient from one end of the stack to the other.

The electrolyte in the matrix 48 is in liquid form and extends into edge region of the matrix to provide a wet capillary seal. The wet capillary seal blocks the escape of the reactant gases from the anode electrode 44 and the cathode electrode 46 into the adjacent manifold areas through the vertical faces 14a, 14b, 16a and 16b. As shown in FIG. 2, the gaskets 26 are in contact with the face of the stack and, therefore, contact the matrix of each fuel cell unit. Capillary forces acting on the electrolyte draw lithium ions, potassium ions and carbonate ions into the gasket. The voltage gradient imposed on the stack causes these lithium and potassium ions to move toward the negative end of the stack 34 and the carbonate ions to move toward the positive end of the stack 36. These lithium and potassium ions, in turn, are replaced by like ions drawn from the interior of the cells. The lithium and potassium ions move together so that the molar ratio of lithium ions to potassium ions is uniform, that is, the average molar ratio of lithium ions to potassium ions in any region of the stack is within 15% of the average molar ratio of lithium ions to potassium ions in the central region 82 of the stack.

Figure 3:
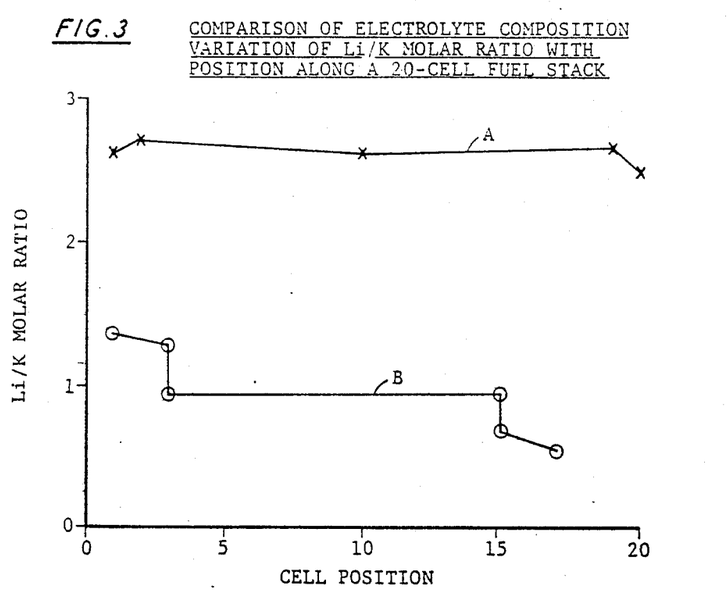
FIG. 3 is a graphical representation of the lithium to potassium molar ratio for two different lithium-potassium carbonate electrolyte compositions as a function of cell position along the length of a fuel cell stack having twenty fuel cell units.

FIG. 3 is a graphical representation of the ratio of lithium ions to potassium ions for two different electrolyte compositions along the length of a fuel cell stack formed of 20 fuel cell units. The first electrolyte composition is an electrolyte having a composition consisting essentially of 72 m % $Li_2CO_3$ and 28 m % $K_2CO_3$. Curve A shows that the lithium to potassium molar ratio for this composition after 2,000 hours of operation is uniform along the length the stack. As can be seen, the lithium to potassium molar ratio at the end regions 78, 80 is within 10% of the molar ratio in the central region 82 of the fuel cell stack.

The second electrolyte composition is a eutectic electrolyte having a composition consisting essentially of 62 m % $Li_2CO_3$ and 38 m % $K_2CO_3$. Curve B shows that the lithium to potassium molar ratio for this electrolyte after only 660 hours of operation is no longer uniform along the length of the fuel cell stack. The test was terminated at 660 hours because of deteriorating performance of the fuel cell stack. The deteriorating performance was attributed in part to the effect that the mobility of the ions had on the performance of the stack. As can be seen, the molar ratio of the end regions differs by more than 15% from the molar ratio of the central region 82. In fact, the average molar ratio for fuel cells at the positive end of the stack in end region 80 is 20 to 30% higher than the average value of the molar ratio along the central region 82 of the stack. At the negative end region 78 of the stack, the average molar ratio is 20 to 30% lower than the average molar ratio along the central region of the stack. This variation in molar ratio of lithium ions to potassium ions causes signficant changes in the properties of the electrolyte and variations in the performance between fuel cells in the fuel stack and in the fuel cell with time. For example, high and low levels of lithium to potassium molar ratio will result in partial electrolyte solidification which will cause a decline in the electrical power output of the fuel cell.

Accordingly, it is desirable to have a relatively uniform molar ratio of lithium ions to potassium ions along the length of the fuel cell stack as shown in curve A of FIG. 3. The cause of this relatively uniform molar ratio is not well understood. It is believed that increasing the amount of lithium carbonate in the electrolyte above 72 m % (and decreasing the amount of potassium carbonate below 28 m %) increases the mobility of the lithium ions in the electrolyte with respect to the potassium ions. As a result, the lithium ions move faster along the voltage gradient than do the adjacent potassium ions causing the molar ratio of the lithium ions to potassium ions (in comparison to the central region) to decrease in the positive end region 80 and to increase in the negative end region 78. On the other hand, decreasing the lithium carbonate content of the electrolyte below 72 m % (and increasing the potassium carbonate content above 28 m %), causes the potassium ions to become more mobile than the lithium ions. As a result, the molar ratio of the lithium ions to the potassium ions (in comparison to the central region 82) increases in the positive end region 80 and decreases in the negative end region 78. For electrolytes having a composition in a narrow range between 70 to 73 m % $Li_2CO_3$ and 27 to 31 m % $K_2CO_3$, it appears that the mobilities of the ions are nearly equal and that a uniform molar ratio of lithium ions to potassium ions is exhibited along the entire length of the fuel cell stack.

As will be realized, electrolyte compositions consisting essentially of approximately 72 m % $Li_2CO_3$ and 28 m % $K_2CO_3$, that is, compositions that are slightly above (e.g. 74 m % $Li_2CO_3$) or slightly below (e.g. 69 m % $Li_2CO_3$) will demonstrate nearly the same uniformity in molar ratios, and may be desirable if other operating characteristics are more important than uniformity in the ion molar ratios. In fact, on occasion such compositions may demonstrate a uniform molar ratio along the length of the fuel cell stack. However, the rate of change of the mobilities appears to increase sharply if the electrolyte is not approximately 72 m % $Li_2CO_3$ and 28 m % $K_2CO_3$ and lies outside the range of 69-74 m % $Li_2CO_3$ and 26-31 m % $K_2CO_3$.

Figure 4:
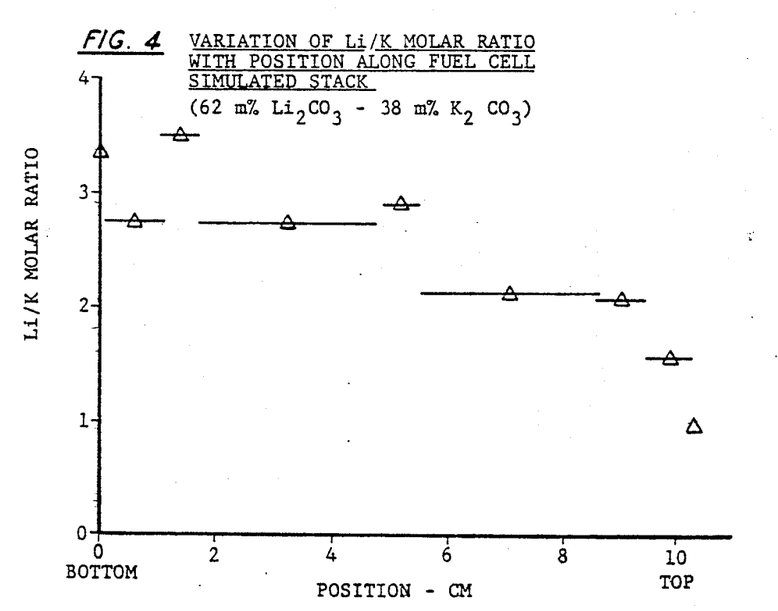
FIG. 4 is a graphical representation of the variation of the lithium to potassium molar ratio as a function of position along the length of a simulated stack for a binary eutectic lithium-potassium carbonate electrolyte (62 m % $Li_2CO_3$ and 38 m % $K_2CO_3$).
Figure 5:
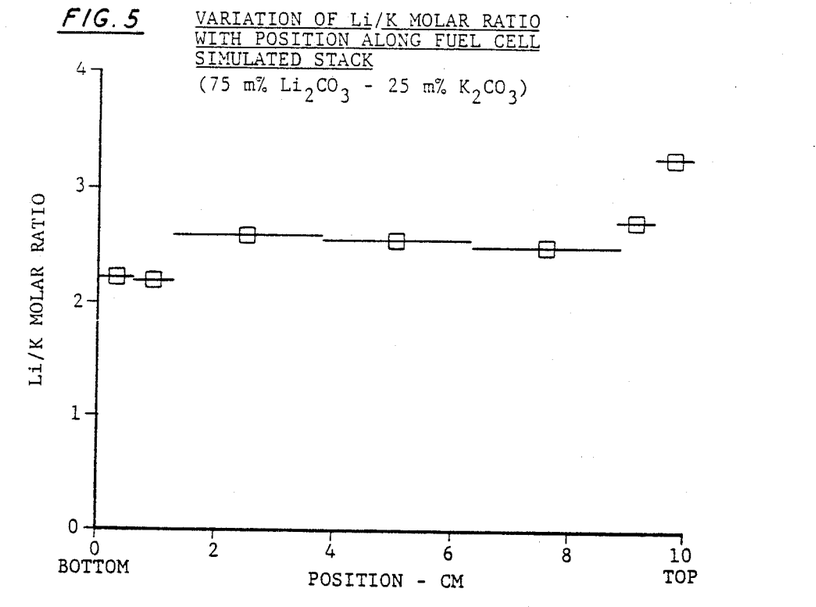
FIG. 5 is a graphical representation of the variation of the lithium to potassium molar ratio as a function of position along the length of a simulated stack for a binary electrolyte composition consisting essentially of 75 m % $Li_2CO_3$ and 25 m % $K_2CO_3$.
Figure 6:
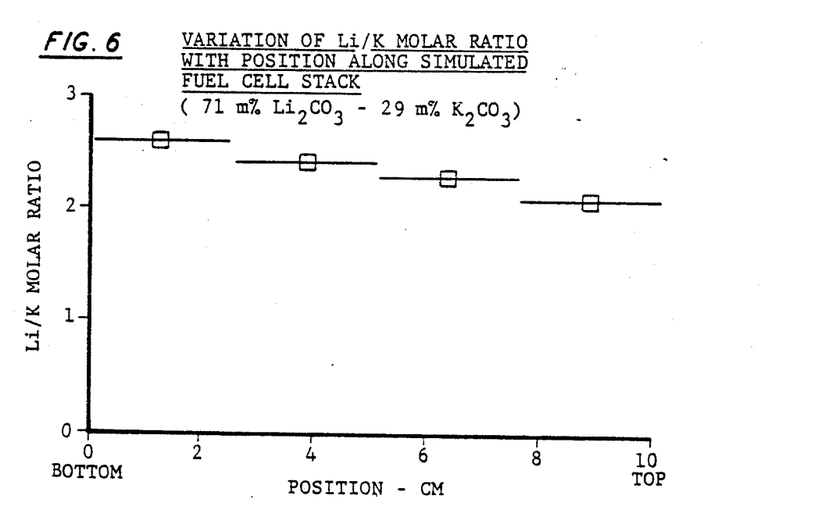
FIG. 6 is a graphical representation of the variation of the lithium to potassium molar ratio as a function of position along the length of a simulated stack for a binary electrolyte composition consisting essentially of 71 m % $Li_2CO_3$ and 29 m % $K_2CO_3$.

This hypothesis is borne out by experimental data which is shown in FIGS. 4, 5, and 6. This data was developed using a test rig which included a 10 centimeter length of gasket held between two alumina blocks. Two conventional fuel cell cathodes were placed in notches at the two ends of the gasket. A quantity of electrolyte was added to the gasket to match the degree of gasket saturation experienced during stack operation. The rig was heated to 650° C. and held at this temperature for a period of time until electrolyte equilibration was reached. A difference in potential was applied across the two electrodes and the rig was monitored until the electrical current was constant with time. After the current reached a constant value, the rig was cooled with the voltage still applied in order to freeze the electrolyte in place. Post-test analyses were performed to determine the variation of electrolyte content and composition along the gasket and in the electrodes. This was done by cutting the gasket into 1 centimeter lengths over all regions (FIG. 6) and 1 centimeter lengths over the central and intermediate regions with shorter lengths at the end regions (FIGS. 4 and 5) and analyzing each length of gasket to determine the molar ratio of ions in the electrolyte.

As shown in FIG. 4, an electrolyte composition consisting of essentially 62 m % $Li_2CO_3$ and 28 m % $K_2CO_3$ exhibited a large change in the lithium ion to potassium ion molar ratio along the length of the gasket of a simulated stack. The electrolyte in the end region 78 showed a decrease in molar ratio which was at least a 40% variation in molar ratio from the central region 82. The electrolyte overall showed almost a 150% variation in molar ratio from the bottom cells to the top cells. Because the ratio decreased from bottom to top and because the potassium ions and the lithium ions move toward the top of the fuel cell stack, it appears that the potassium ions must have had a greater mobility than the lithium ions.

FIG. 5 shows the variation in molar ratio along the length of the gasket of a simulated stack having an electrolyte consisting essentially of 75 m % $Li_2CO_3$ and 25 m % $K_2CO_3$. The curve shows the mobility of the lithium ions in this composition is greater than the mobility of the potassium ions because the ratio of lithium ions to potassium ions increases at the negative end of the simulated stack. In fact, the end region 78 of the simulated stack shows an increase of at least 25% in the lithium to potassium molar ratio in comparison to the molar ratio of the central region 82.

FIG. 6 shows the variation in molar ratio of lithium ions to potassium ions along the length of a simulated stack having an electrolyte consisting essentially of 71 m % $Li_2CO_3$ and 29 m % $K_2CO_3$. The lithium to potassium ion ratio decreases gradually along the length of the simulated stack and is within 15% of the average molar ratio of the central region of the simulated stack. This suggests that potassium ions in this composition have a slightly greater mobility than the lithium ions. Nevertheless, a uniform molar ratio of lithium ions to potassium ions exists along the length of the stack.

The electrolyte composition which is initially provided to a fuel cell changes at a rapid rate during the initial period of operation before the steady state composition is reached if the active lithium ions react with components of the fuel cell to form stable lithium compounds. In those cells where such reactions occur, the steady state composition is generally reached before 2,000 hours of operation and will change its lithium content through these reactions by less the five percent over the next 20,000 hours of operation. Accordingly, each fuel cell which is to be supplied with an electrolyte having a preselected composition is also supplied with an additional amount of lithium in the form of $Li_2CO_3$. The additional amount of $Li_2CO_3$ compensates for the amount of lithium which combines with components in the fuel cell stack during the initial period of operation. For example, the electrolyte shown in curve A of FIG. 3 contained an additional amount of $Li_2CO_3$ such that the initial composition consisted of essentially 78 m % $Li_2CO_3$ and 22 m % $K_2CO_3$.

One empirical method for determining the additional amount of $Li_2CO_3$ includes filling the cells of the stack with an electrolyte having an initial lithium carbonate to potassium carbonate molar ratio which is greater than the molar ratio of the preselected electrolyte. The initial estimate of the molar ratio is based on cell size and on the presence of lithium consuming components. The next step is to operate the stack for a period of time (which is normally less than 2,000 hours) until steady state conditions are reached. Then, after allowing the stack to cool and removing the electrolyte from the cells, such as by washing the electrolyte matrix with a dilute acetic acid solution, the amount of lithium ions that reacted to form stable compounds is determined. After determining the amount of lithium ions that are lost by forming stable compounds during operation, a new electrolyte composition is formed which contains an additional amount of lithium to make up for the lithium that forms stable compounds. The new electrolyte composition is used to fill fuel cells of the same design. The above steps are repeated until the actual steady state composition is equal to the preselected steady state composition. Thus, the method for establishing the initial electrolyte composition includes the steps of determining a first amount of lithium which will react to form stable compounds during operation of the fuel cell and then disposing a molten carbonate electrolyte in each fuel cell which consists essentially of (1) an amount of $Li_2CO_3$ that contains the first amount of lithium and (2) the preselected mixture (that is, typically 70 to 73 m % $Li_2CO_3$ and 27 to 30 m % $K_2CO_3$) such that after operation of the fuel cell for two thousand hours the molten carbonate electrolyte consists essentially of 70 to 73 m % $Li_2CO_3$ and 27 to 30 m % $K_2CO_3$. This steady state composition is lithium rich in comparison to the eutectic composition and, when tested, showed other advantages.

Figure 7:
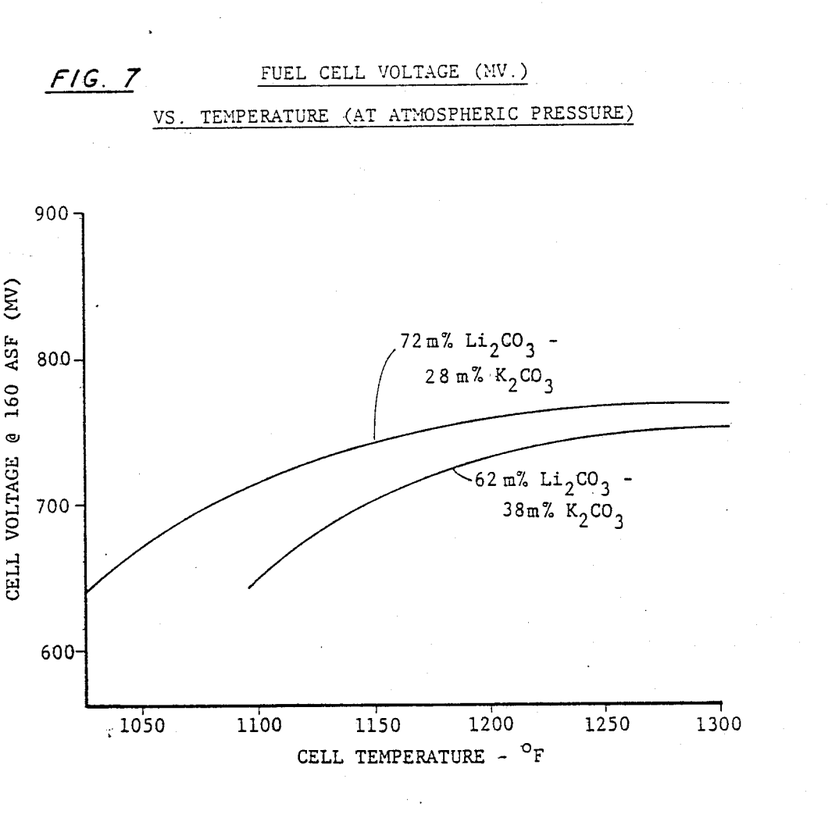
FIG. 7 is a comparison of the cell voltage in millivolts versus cell temperature in degrees Fahrenheit for fuel cells operated with a eutectic electrolyte composition at one atmosphere of pressure and an identical fuel cell operated with a high lithium content electrolyte at one atmosphere of pressure.

One advantage is the fuel cell performance which results. FIG. 7 is a graphical representation of fuel cell voltage for a fuel cell operating at 160 amperes per square foot (172 milliamps per square centimeter) as a function of cell temperature at one atmosphere of pressure. The cell used fuel having an inlet composition of 51.0% $H_2$, 9.6% CO, 10.6% $CO_2$ and 28.8% $H_2O$ with an 81% utilization of the $H_2$ and CO. The cell used an oxidant having an inlet composition of 11.7% $O_2$, 17.1% $CO_2$, 64.1% $N_2$ and 7.1% $H_2O$ with a 30% utilization of the $CO_2$. The performance of the fuel cell using the higher lithium content electrolyte composition of 72 m % $Li_2CO_3$ and 28 m % $K_2CO_3$ is better than the performance of a fuel cell using a eutectic electrolyte which consists essentially of 62 m % $Li_2CO_3$ and 38 m % $K_2CO_3$. In addition, as cell temperature decreases, the performance advantage of the lithium enriched electrolyte improves with respect to the eutectic electrolyte. For fuel cells producing the same voltage, fuel cells using lithium enriched electrolyte will operate at a lower temperature than fuel cells using a eutectic electrolyte. Because corrosiveness of the electrolyte increases with temperature and increased corrosiveness decreases cell life, operating at a lower temperature will increase cell life. At the same operating temperature, the corrosiveness of the lithium enriched electrolyte is no worse than the corrosiveness of the eutectic electrolyte. In fact, preliminary results indicate that the loss of NiO from the cathode is smaller than the loss which occurs with a eutectic electrolyte.

Although the invention has been shown and described with respect to preferred embodiments thereof, it should be understood by those skilled in the art that various changes and omissions in the form and detail thereof may be made therein without departing from the spirit and scope of the invention.

I claim:

1. A molten carbonate electrolyte consisting essentially of approximately 72 m % $Li_2CO_3$ and 28 m % $K_2CO_3$ which displays a uniform lithium to potassium molar ratio under operative conditions along the length of a fuel cell stack having a plurality of fuel cells disposed adjacent to each other which are in ion communication and which are subjected to a voltage gradient.

2. The molten carbonate electrolyte of claim 1 wherein the electrolyte consists essentially of 70 to 73 m % $Li_2CO_3$ and 27 to 30 m % $K_2CO_3$.

3. The molten carbonate electrolyte of claim 2 wherein the electrolyte consists essentially of 72 m % $Li_2CO_3$ and 28 m % $K_2CO_3$.

4. A fuel cell having an electrolyte matrix containing a binary alkali metal carbonate electrolyte which is molten during operation of the fuel cell, an anode electrode in contact with the electrolyte matrix and a cathode electrode in contact with the electrolyte matrix, wherein the improvement comprises utilizing as the electrolyte an electrolyte having a steady state composition which consists essentially of 70 to 73 m % $Li_2CO_3$ and 27 to 30 m % $K_2CO_3$.

5. The molten carbonate fuel cell of claim 4 wherein the electrolyte consists essentially of 72 m % $Li_2CO_3$ and 28 m % $K_2CO_3$.

6. The molten carbonate fuel cell of claim 5 wherein the matrix is lithium aluminate.

7. A method for establishing a steady state electrolyte composition for a molten carbonate fuel cell employing a binary $Li_2CO_3$-$K_2CO_3$ electrolyte comprising:

determining a first amount of lithium which will react to form stable compounds during operation of the fuel cell and change the molar ratio of the binary electrolyte before steady state composition is reached;

disposing a molten carbonate electrolyte in the fuel cell which consists essentially of a mixture of (i) an amount of $Li_2CO_3$ which contains the first amount of lithium and (ii) a second amount of 70 to 73 m % $Li_2CO_3$ and 27 to 30 m % $K_2CO_3$ such that after operation for two thousand hours the molten carbonate electrolyte consists essentially of 70 to 73 m % $Li_2CO_3$ and 27 to 30 m % $K_2CO_3$.

8. In a method of operating a molten carbonate fuel cell stack having a plurality of cells disposed adjacent to each other, and across which a voltage gradient exists during operation, each of said fuel cells having an electrolyte in ion communication with the electrolyte of adjacent cells through flow paths which exist as a result of construction of the cell, the improvement comprising:

employing an electrolyte which consists essentially of 70 to 73 m % $Li_2CO_3$ and 27 to 30 m % $K_2CO_3$ to pass electrical charges between the cathode and the anode of each fuel cell, and, operating the fuel cell stack with a uniform lithium to potassium molar ratio along the length of the fuel cell stack.

* * * * *